Nov. 2, 1937.   H. J. N. H. KESSENER   2,098,152
TREATMENT OF SEWAGE AND OTHER WASTE LIQUORS
Filed Sept. 27, 1935
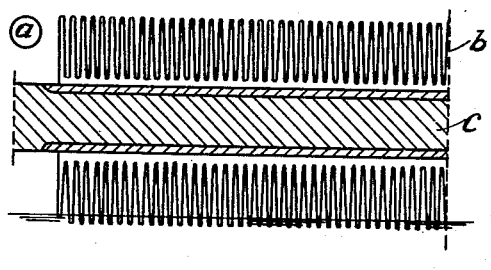
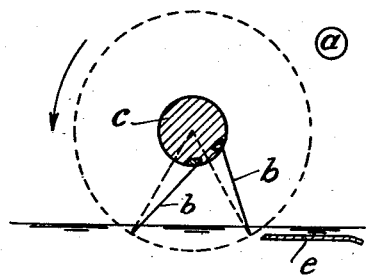
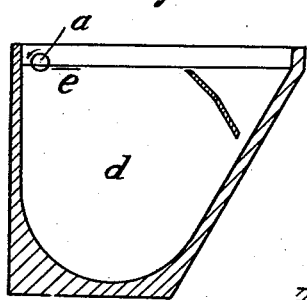
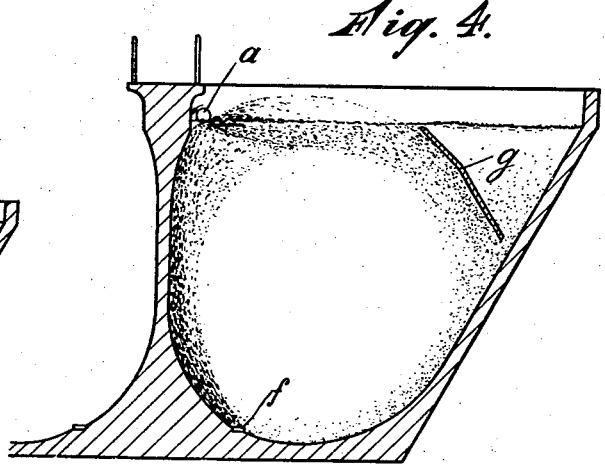
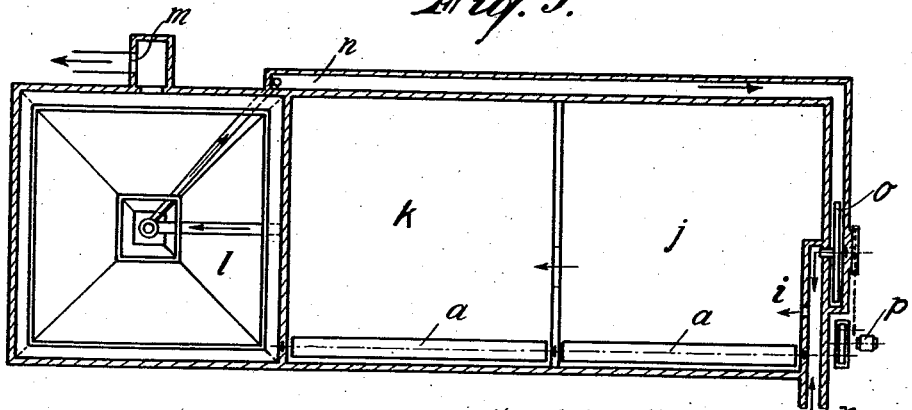
H. J. N. H. Kessener
INVENTOR
By Glascock Downing & Seebold
Attys.

Patented Nov. 2, 1937

2,098,152

UNITED STATES PATENT OFFICE 2,098,152

TREATMENT OF SEWAGE AND OTHER WASTE LIQUORS

Herman Joseph Nicolaas Hubert Kessener, The Hague, Netherlands

Application September 27, 1935, Serial No. 42,518
In Great Britain October 6, 1934

7 Claims. (Cl. 210—8)

This invention relates to the treatment of sewage and other waste liquors and provides improvements in apparatus for carrying out a treatment of such sewage or the like in tanks by surface aeration.

In order to provide for the maximum effective treatment of sewage or the like by surface aeration it is essential to provide means for initiating and maintaining a rippling of the surface of the liquid and a constant circulation of the liquid in the tank or trough, so that liquid is brought from the bottom of the trough to the surface in contact with the atmosphere and that there is no stagnation of the liquid in any part of the said tank or trough.

The efficiency of an installation operating on a surface aeration system, for example for the treatment of sewage or impure water depends upon a vigorous rippling of the surface of the liquid as well as upon the development and retention of a large quantity of air in the liquid in the form of bubbles for a substantial period, by preventing the bubbles introduced into the liquid from escaping immediately to the surface of the liquid, and also upon a general circulation of the whole body of water under treatment.

An object of this invention is to provide a plant by means of which a maximum rippling of the surface of the liquid is effected as well as a maximum amount of air carried in the form of bubbles in circulation in the liquid, in proportion to the amount of energy expended.

According to the invention the said object is attained by using an improved aerator and by increasing the efficiency of said aerator by applying, in conjunction therewith, certain improved means more fully to be described hereinafter.

Said aerator is adapted to be rotatably mounted in an aeration tank and comprises a shaft or like part, having a number of aeration elements— e. g. bristles, resilient strips, combs or the like— extending outwardly therefrom, in such a manner that each element, at least at its outer portion, extends in a direction angular to a line passing perpendicularly through the axis of the shaft and the outer end of said element, forwardy in the direction of rotation, of said line.

The aerating elements may be straight throughout their entire length, but they may have also another shape, provided that if said aerator is immersed to less than half its diameter in a liquid, contained in an aerating tank, in which the aerator is rotatably mounted, the acute angle between the outer portion of an aeration element and the horizontal, as the said element enters the liquid, is less than the acute angle between the horizontal and a line passing through the outer end of said aeration element and passing at right angles through the axis of the shaft.

The invention will be more fully understood with reference to the accompanying drawing, in which:

Fig. 1 shows a longitudinal section, and
Fig. 2 a transverse section of an aerator constructed in accordance with this invention.
Fig. 3 is a diagram illustrating a convenient manner of arranging the aerator in an aeration tank.
Fig. 4 is a diagram illustrating a modification of the arrangement shown in Fig. 3.
Fig. 5 is a plan view of an aerating installation including aerators constructed in accordance with this invention.

As shown in Figs. 1 and 2, $a$ is a cylindrical aerator constructed of a number of aeration elements $b$ carried by a rotary shaft $c$. These elements $b$, which may be combs of suitable material, may be of a resilient character, so that when the aerator is mounted partly immersed in a body of liquid, each element yields or bends on coming into contact with the liquid and recovers its shape on approaching the point of exit from the liquid. This causes a fine spray to be thrown above the surface of the liquid in a flattened trajectory, whereby the falling drops are spread over the whole surface of the liquid and in falling thereon further increases the rippling of the said surface.

The aeration elements may be corrugated or undulatory. These elements, combs, bristles or resilient strips are disposed on the rotary shaft so as to extend therefrom in a direction which is not radial so that the angle of the strip to the horizontal, as it enters the liquid, is less than the corresponding acute angle in the case of radial strips.

To prevent a too rapid escape of air bubbles which have been beaten into the liquid by the aerator mounted to operate on impure water or other liquid in a tank $d$ (Fig. 3), a plate $e$ or fixed unit is arranged in a substantially horizontal position below the surface of the liquid, to promote the conducting of these bubbles into deeper layers by the circulating flow. The remote end of this plate may be inclined or curved in a downward direction.

As shown in Fig. 4, in order to increase oxygenation of the liquid in a relatively deep aeration tank, an air diffuser $f$ may be submerged in the said liquid and a deflector or baffle $g$ is provided to assist in assuring a good circulation.

The improved aerator can be employed in tanks, troughs or conduits for the aeration of sewage, water or the like through which a constant flow of liquid under treatment is maintained.

In the installation illustrated in Fig. 5, the liquid is admitted from a conduit $h$ through an inlet $i$ into a tank $j$ and passes into a second tank k through a submerged orifice. Each of these tanks is provided with an aerator a and a fixed plate (not shown).

The second tank k discharges to a settling tank l provided with an effluent chamber m and a sludge return conduit n from which sludge can be lifted by a water wheel, Archimedean screw or bucket chain o and returned into the inlet conduit h.

The aerators a and sludge lifter o can be driven by a single motor p through suitable gearing.

The efficiency of the oxygenation obtained in surface aeration installations previously in use is low in comparison with the energy expended, in consequence of the fact that the additional value of initiating and maintaining air bubbles in the liquid was not fully recognized. Only a small quantity of bubbles were developed and the greater part escaped immediately at the surface of the liquid and thus were not circulated with the liquid so as to give off a part of their oxygen in the deeper levels.

The use of the improved aerator effects a maximum aeration with a minimum power consumption by, in addition to intensive rippling of the surface, spraying and general circulation of the liquid, carrying into the liquid a maximum amount of air in fine bubbles, these being retained in the liquid by the aid of the horizontal baffle or deflector and further conducted along in the circulated flow throughout the cross-sectional area of the aeration tank.

This is obtained by:

(a) Fixing the aeration elements on the rotary aerator in such a direction, as above described, that their angle to the horizontal as they enter the liquid is less than the corresponding acute angle in the case of radially directed elements.

Owing to this position of the aeration elements a considerably greater quantity of air bubbles is beaten into the liquid and pushed in a more downward direction, thus reducing the risk of their early escape. The effect on circulation of the elements as they leave the liquid is also promoted by their disposition on the shaft, and their spray creating effect is retained.

(b) By the use of the plate or baffle fitted in a substantially horizontal position just behind the place where the developed bubbles get free from the aerator elements in the water, so that these bubbles are more prone to be conveyed to the bottom of the tank by the circulating flow.

The above described aeration device is applicable to aeration tanks of less than an ascertainable cross-sectional area. If it is desirable in the interest of economy in the capital and maintenance cost of an activated sludge plant, to employ aeration tanks of very large cross-sectional area, the maximum aeration with the least cost will result from the combination of the improved aerator with an air blowing system.

These two devices supplement each other in operation; the rotary aerator by supplementing deficiency in the circulation effect due to the introduction of the air bubbles alone into the liquid, and the diffuser f by introducing an increased quantity of air in bubbles which are further atomized or broken up by the action of the rotary aerator.

I claim:

1. An apparatus for aerating sewage and other liquids, comprising a liquid containing tank, a shaft in a substantially horizontal position, means for rotatably supporting said shaft with its axis above the surface of the liquid in the tank, a plurality of aeration elements extending outwardly from said shaft, said aeration elements extending in a direction such that the acute angle between at least the outer portion of each aeration element and the horizontal as the said element enters the liquid, is less than the acute angle between the horizontal and a line passing through the outer end of the said aeration element and passing at right angles through the axis of the shaft, and means for correspondingly rotating said shaft in such a direction that each such line shall be in arrear of its corresponding aeration element, whereby the upper portion of the liquid is projected into the air in a flattened trajectory, and the main body is maintained in motion in a substantially circular path.

2. An apparatus according to claim 1, comprising a deflector immersed in the liquid, in the path of the stream of liquid flowing from the rotary aerator, obliquely downwardly and forwardly with respect to the direction of the said stream whereby bodily movement of the liquid is controlled.

3. An apparatus according to claim 1, modified in that the shaft is arranged adjacent one wall of the tank, and a plate immersed beneath the surface of the liquid but still above the level of the tips of the aeration elements when at their lowest point, said elements being between said plate and said wall of said tank and spaced apart from both, whereby the movement of the injected air bubbles is controlled.

4. An apparatus according to claim 1, comprising a source of compressed air, an air diffuser submerged in the liquid in the tank substantially vertically below said rotary aeration elements and arranged so as to supply air bubbles to the stream of liquid, moving towards the aerator so as to support the liquid circulation.

5. The process of aerating sewage and other liquids which comprises supporting said liquid in a tank, propelling a portion thereof through the air and back to the liquid, setting up continuous rotary motion of the entire mass of the liquid and forcing additional air into the liquid in a direction tangential to and in the sense of the rotary movement thereof.

6. In apparatus for aerating sewage and other liquids which comprises a liquid containing tank adapted and arranged to maintain liquid therein up to a definite level, an aerating device comprising a rotatable shaft mounted above the said plane, equipped with a plurality of aerating elements mounted on said shaft, the improvement which comprises mounting said elements on said shaft in such a position that the acute angle at the tip of each element with a line drawn from said tip to the axis of said shaft is located in advance of said line as the said element enters the liquid.

7. In an apparatus for aerating sewage and other liquid which comprises means for projecting a portion of the liquid through the air and returning it to the liquid and for producing circulatory motion in the liquid, and additional means for injecting air into said liquid, the modification that said air is injected tangentially to the path of the rotating liquid, in the sense of its rotation.

HERMAN JOSEPH NICOLAAS
HUBERT KESSENER.